United States Patent [19]
Zerow

[11] Patent Number: 5,364,156
[45] Date of Patent: Nov. 15, 1994

[54] WEIGHTED, FOLDABLE VEHICLE COVER

[76] Inventor: Danne J. Zerow, 7504 Montclaire, Godfrey, Ill. 62035

[21] Appl. No.: 112,974

[22] Filed: Aug. 30, 1993

[51] Int. Cl.$^5$ ............................................. B60J 11/00
[52] U.S. Cl. ................................... 296/136; 296/95.1
[58] Field of Search ............................. 296/136, 95.1; 160/370.2; 150/166, 168

[56] References Cited

U.S. PATENT DOCUMENTS

| | | | |
|---|---|---|---|
| 3,862,876 | 1/1975 | Graves | 161/44 |
| 4,634,618 | 1/1987 | Greer | 428/81 |
| 4,842,324 | 6/1989 | Carden | 296/136 |
| 4,938,522 | 7/1990 | Herron | 296/136 |
| 4,961,981 | 10/1990 | Keegan | 296/136 |
| 4,972,982 | 11/1990 | Yeh | 150/166 |
| 4,979,339 | 12/1990 | Jones et al. | 296/136 X |
| 5,097,633 | 3/1992 | Jones | 52/3 |

Primary Examiner—Joseph Pape
Attorney, Agent, or Firm—Don W. Weber

[57] ABSTRACT

A protective vehicle cover for the passenger compartment of a vehicle or the cab of a pick-up truck is presented. The cover has a top with a front, rear and side flaps attached. The side flaps are connected along their vertical edges by elasticized accordion connectors. The lower horizontal edge of each flap has a hollow sleeve. Sand, small gravel, or other weighted material may be placed inside the hollow sleeve and sealed by an end cap. Placing the weight along the lower horizontal edge of each flap, along with the elasticized accordion flap connectors, keeps the cover in place on a vehicle during inclement weather. The cover also includes a VELCRO fastener adjoining the front and one side of the cover so that the cover may be generally adjusted to conform to the dimensions of the vehicle.

3 Claims, 2 Drawing Sheets

WEIGHTED, FOLDABLE VEHICLE COVER

BACKGROUND OF THE INVENTION

This invention relates to the field of vehicle covers and more particularly to a vehicle cover which is weighted for protecting the passenger cab of a vehicle.

Many vehicles such as passenger cars or trucks may be parked outside in inclement weather for certain periods of time. In order to protect the vehicle, vehicle covers are frequently used.

One such vehicle cover is disclosed in the 1990 patent issued to Herron. This protective vehicle cover completely covers the vehicle and is secured about the vehicle by means of an elasticized lower perimeter.

A variation of covering the entire vehicle is found in the 1990 patent issued to Yeh. This vehicle cover and method of making the cover involves securing a cover on the top, front and back and sides of the vehicles, commonly known as the passenger compartment. The Yeh patent is attached to the vehicle by means of fasteners fixed to the panels and extending across the corners to secure the covers. One disadvantage of the Yeh patent is that it requires installation on the vehicle itself and is not, as such, self-contained.

Securing the vehicle cover to the vehicle has been a problem and the subject of several patents in the recent years. The 1992 patent issued to Jones utilizes a cover with hold-downs consisting of bottles tied to the lower edges of the cover. The bottles are filled with some sort of weight and are then attached to the vehicle cover. One of the problems encountered with this device is the bulky and inflexible nature of the containers as well as the possibility that the weights will be lost when they are disattached from the vehicle cover itself.

It is an object of this invention to provide a lightweight, foldable vehicle cover for passenger cars and trucks. It is a further object of this invention to provide a lightweight cover having compartments near the lower perimeter of the cover for placing weights. It is a still further object of this invention to provide a lightweight, weighted protective vehicle cover in which the weights used to keep the cover on the car or truck may be filled or emptied depending on the weather conditions and the necessity for periodic use of the device. A still further object of this invention is to provide a cover such as described above wherein the weight of the cover may be dispensed by means of a plug so that sand, gravel or other gritty substances may be deposited on the roadway in an emergency.

Further and other objects of this invention will become apparent upon reading the following Specification.

BRIEF DESCRIPTION OF THE INVENTION

A lightweight, foldable vehicle cover is presented having a top, a front, a back, and two sides. The front, back and two sides are attached to each other by means of an elasticized accordion connector at each vertical edge. The accordion connectors make the cover fit snugly over the passenger compartment of a passenger car or truck. The lower horizontal edges of the front, back and side flaps of the vehicle cover are hollowed out and have a cylindrical compartment therein. This cylindrical compartment may be conveniently filled with sand, gravel or other heavy material by removing the end cap and filling the compartment.

The cover is placed over the vehicle during inclement weather conditions while the vehicle is parked. The weighted edges of the flaps, along with the elasticized accordion connection of the flaps and a VELCRO adjustment along one vertical edge, enable the cover to stay in place in turbulent or inclement conditions. The cover is easily foldable and storable inside the automobile trunk or cab of a truck. In particularly icy or stormy conditions the end caps of the cover may be removed and the sand or gravel may be deposited near the tires of the vehicle in order to facilitate emergency traction conditions.

DETAILED DESCRIPTION OF THE DEVICE

Figure 1:
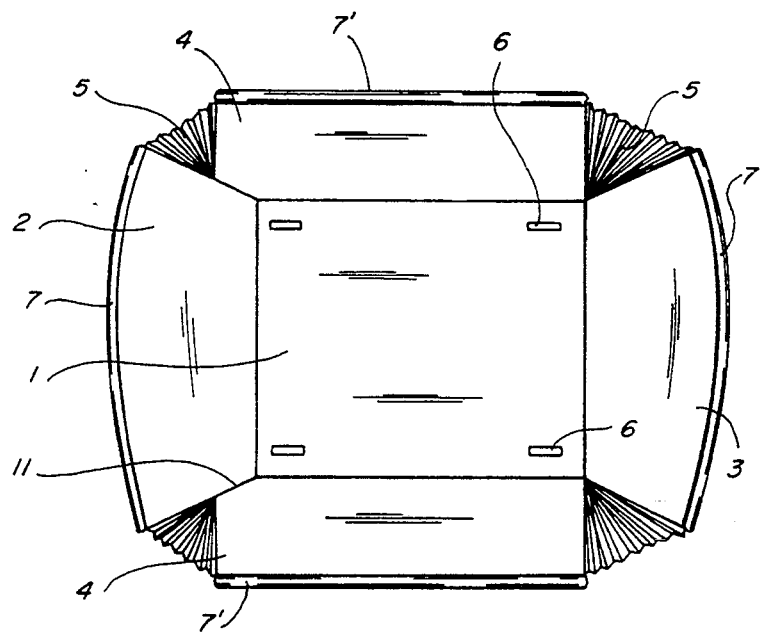
FIG. 1 is a top view of the passenger vehicle cover.

A protective cover for a passenger vehicle or truck is presented. The cover is made of lightweight, waterproof material, such as vinyl plastic. The cover for the passenger compartment of an automobile is best shown in FIG. 1.

The automobile vehicle protective cover has an essentially square top 1 surrounded by a front flap 2, a rear flap 3, and side flaps 4. These flaps are attached to the top by means of sewing or other permanent type of securing means. The flaps themselves are connected to each other along their adjacent vertical edges by means of an elasticized accordion flap connector 5. These elasticized accordion type connectors 5 connect the adjacent vertical edges as best shown in FIG. 1. The purpose of these accordion connectors is to secure the contour of the flaps as nearly as possible to the contour of the different type of automobile passenger compartments now in current use in the United States and the rest of the world.

The weighted vehicle protective cover is also foldable due to the elastic nature of the accordion connectors, the light weight of the connector itself and the type of material used for the cover. The entire device may be folded into a small package.

In order to facilitate placement of the cover on the vehicle passenger compartment, handles 6 are provided near each corner of the top of the device.

Figure 4:
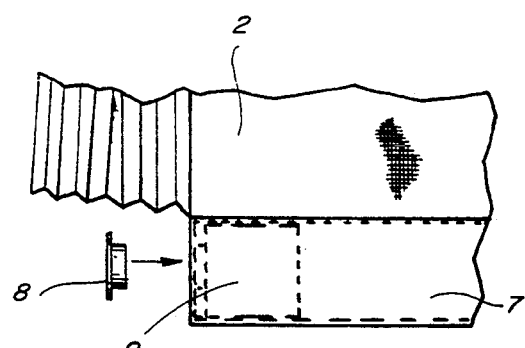
FIG. 4 is a partially detailed exploded view of the lower front edge of the front flap shown in FIG. 3.

The instant device discloses a unique method for insuring that the cover remain in place during windy, turbulent or other inclement conditions. At the lower horizontal edge of each flap there is a hollow sleeve 7. (This hollow sleeve is shown in detail on FIGS. 2 and 4 of this disclosure.) The lower sleeve 7, located at the bottom horizontal edge of the front, rear and side flaps is adapted to receive a plastic hollow tube 9 having an end cap closure 8. This plastic hollow tube 9 may be short, as shown on FIGS. 2 and 4, or it may run the entire length of the lower edge of the flap. The plastic hollow tube would be flexible enough to conform itself to the arcuate pattern of the front or rear flaps. It could also lie in a straight line as shown on the side sleeves 7'.

When it is desired to prepare the protective vehicle cover for use, the end cap 8 is removed from the plastic tube 9 and the plastic tube is filled with a weighted material. This material is most preferably sand or small gravel, but it may also be water, or any other type of weighted material capable of being deposited inside the plastic tube 9 located about the lower horizontal edge of the flaps. Once the flaps are thus weighted the end cap 8 is inserted into the plastic tube 9 of the lower edge of the flaps and the device may be deployed.

Figure 2:
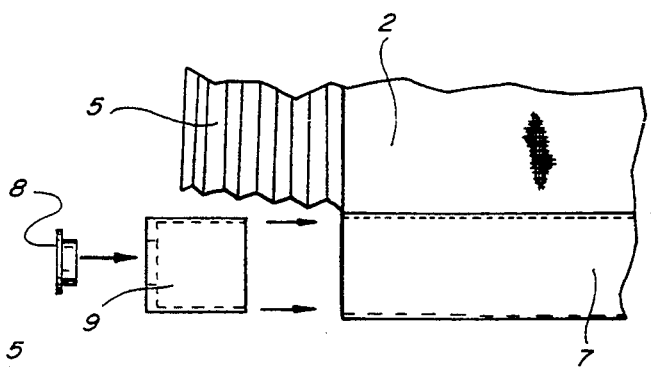
FIG. 2 is a partial detailed exploded view of the accordion connector and lower edge of the front flap shown in FIG. 1.
Figure 3:
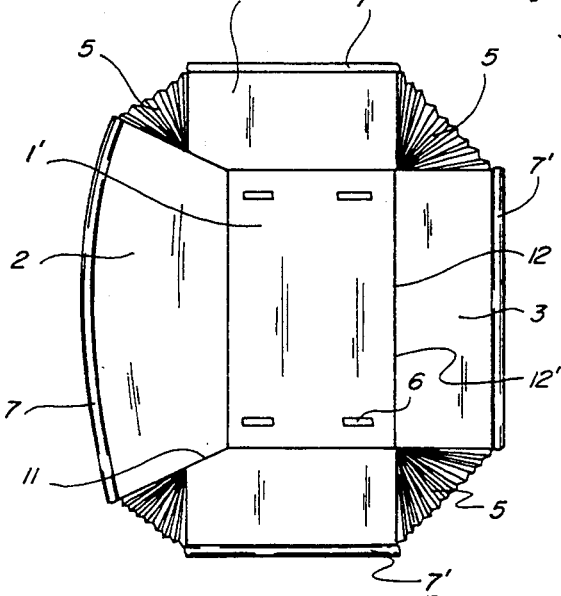
FIG. 3 is a top view of the vehicle cover shown in the pick-up truck embodiment.

FIGS. 1 and 2 show the approximate relative dimensions of a protective vehicle cover for a passenger vehicle. This device may also be adapted for use on pick-up trucks. In this embodiment, the passenger cab of the vehicle pick-up truck would be covered with the protective vehicle cover. As best shown in FIG. 3, the top 1' of the pick-up truck vehicle cover is rectangular. Attached to the top 1' of the pick-up truck embodiment are front 2, rear 3 and side 4 flaps. These flaps are attached in the same manner as on the passenger car embodiment. The flaps are connected at their vertical edges by means of the accordion connectors 5. The top 1' also has handles 6. Along the lower horizontal edges of the flaps are found the hollow sleeve 7 (curved for the front flap 2) and flap hollow sleeves 7' for the back and side flaps.

Figure 5:
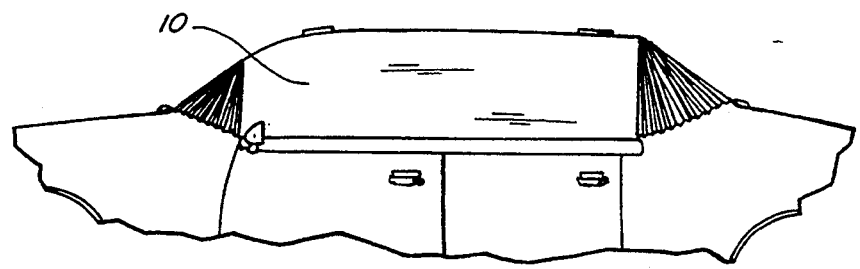
FIG. 5 is a side partial perspective view of a passenger vehicle shown with the protective cover in place.
Figure 6:
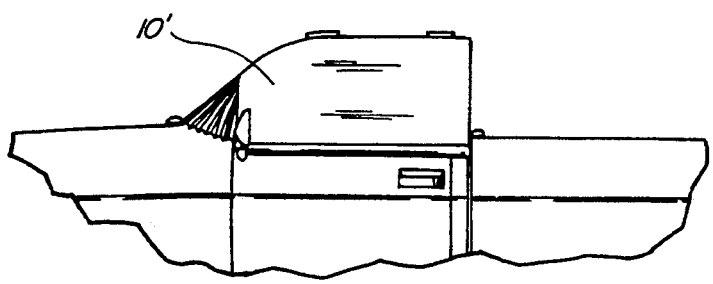
FIG. 6 is a side partial perspective view of the protective cover shown in place over the cab of a pick-up truck.
Figure 7:
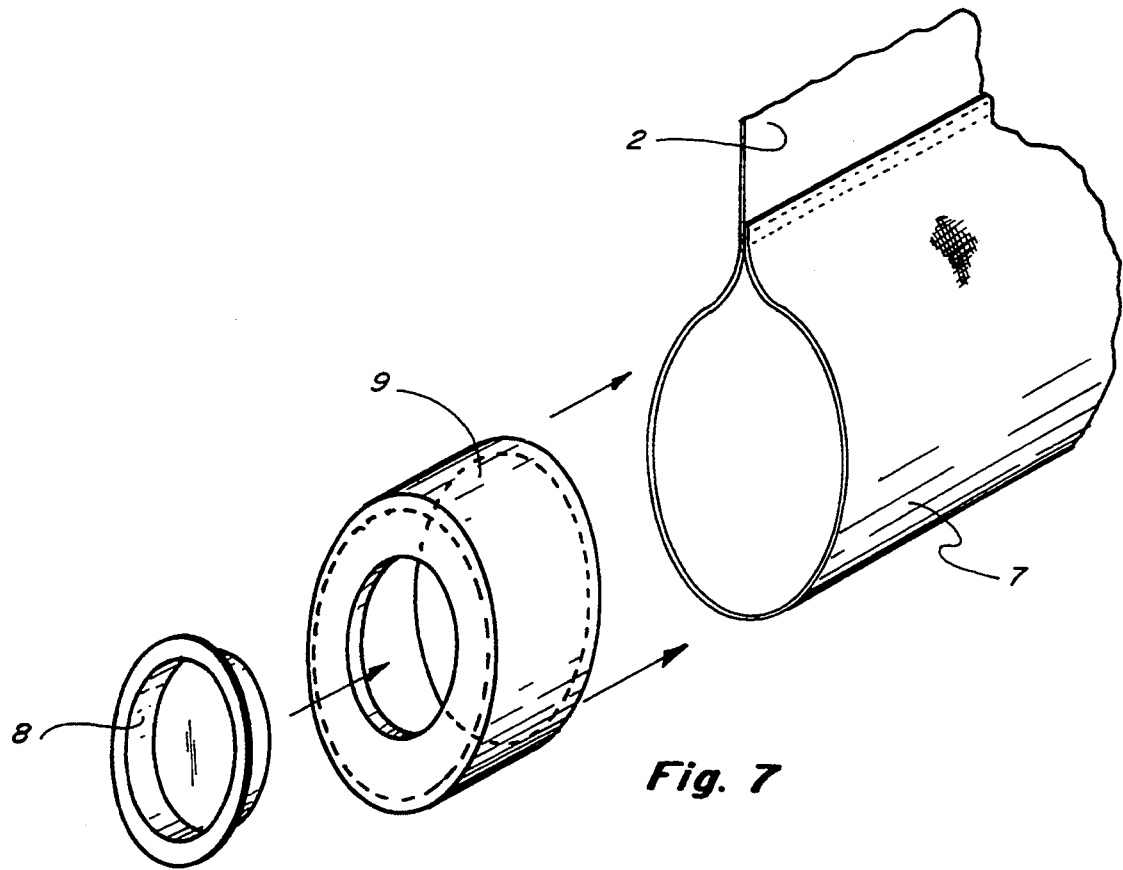
FIG. 7 is a partial detailed perspective view of the end cap and lower sleeve shown in FIGS. 2 and 4.

As best shown on FIGS. 5 and 6, the protective vehicle cover is placed over the passenger compartment 10 of a passenger vehicle (FIG. 5) or over the truck cab 10' of a pick-up truck (FIG. 6). With the weights in place on the lower horizontal edges of the flaps, the protective vehicle cover will remain in place.

One special refinement to the protective vehicle cover is that it is adjustable to different makes of automobiles or trucks. A VELCRO fastener along the vertical seam 11 (FIGS. 1 and 3) between the side and front of the cover enables the user of this device to adjust the snugness of the fit of the vehicle cover according to the particular requirements of the automobile or pickup truck involved.

Additionally, the rear flap 3 of the vehicle truck cover is removable in that particular embodiment. The rear flap 3, shown on FIG. 3, is attached to the pick-up truck top 1' along seam 12 by means of a long VELCRO strip fastener 12'. The vehicle rear flap 3 as shown in FIG. 3 is also detachable from the elasticized accordion flap connectors 5 by means of elongated VELCRO fasteners. Thus the rear flap of the pick-up truck embodiment may be removed if desired.

The exact dimensions of the passenger vehicle or pick-up truck cover need not be specified as there are many makes and models of automobile passenger cars and pick-up trucks currently in use. The approximate proportion of the top to the front, rear and side flaps of the vehicle cover is as shown and described in the drawings.

Obviously, different types of caps may be utilized to contain the weighted material within the tubes. VELCRO fasteners, screw-in type fasteners or many other types of cloth fasteners may be used to close the ends of the weighted sleeves. These sleeves may even be tied together provided the weighted material will not leak out the end once it is thus closed.

The preferred material for this cover is nylon or other type of waterproof material which is water resistant yet easily foldable into a small carrying case or pouch. When not in use, the protective vehicle cover may be placed in the pouch and may be put into the trunk with or without the weighted material in the flexible plastic sleeves. VELCRO fasteners may be interchangeably used with snaps, zippers or other types of fasteners.

Slight variations of the particular design or closures or methods of connecting the flaps or type of material used are still within the contemplation of this device.

Having fully described my device I claim:

1. A weighted protective cover for a vehicle, comprising:
    (a) an essentially rectangular top; and
    (b) essentially rectangular front, rear and side flaps, each flap having upper and lower essentially horizontal edges and essentially vertical sides, wherein the upper edge of each flap is attached to a separate side of said rectangular top;
    wherein the essentially vertical sides of adjacent flaps are connected by elasticized accordion connectors; and
    wherein each essentially horizontal lower edge of said flap has a hollow sleeve for receiving a weighted object.

2. A weighted protective cover as in claim 1, further comprising VELCRO strip fasteners along the vertical edge of said front flap and one side flap, whereby said cover may be adjusted in size to fit the passenger area of said vehicle.

3. A weighted protective cover as in claim 1, wherein the back flap of said cover is detachable from said top.

* * * * *